United States Patent [19]

Van Den Akker et al.

[11] Patent Number: 4,961,863
[45] Date of Patent: Oct. 9, 1990

[54] PROCESS FOR THE SEPARATION OF SOLIDS FROM A MIXTURE OF SOLIDS AND FLUID

[75] Inventors: Hendrikus E. A. Van Den Akker, Amsterdam; Rudi Everts, The Hague; Jouke J. Woudstra, The Hague; Peter H. Barnes, The Hague; Cornelis M. Verheul, The Hague; Hendrik A. Dirkse, The Hague, all of Netherlands

[73] Assignee: Shell Oil Company, Houston, Tex.

[21] Appl. No.: 321,617

[22] Filed: Mar. 10, 1989

[30] Foreign Application Priority Data

Mar. 10, 1988 [GB] United Kingdom ............... 8805755

[51] Int. Cl.$^5$ ............................................... B01D 45/12
[52] U.S. Cl. ........................................ 210/788; 55/1; 55/346; 209/144; 422/147
[58] Field of Search .................... 55/1, 342, 343, 345, 55/346, 349, 459.1, 459.3, 459.4, 460; 208/153, 161; 210/512.2, 787, 788; 422/147; 209/144, 211

[56] References Cited

U.S. PATENT DOCUMENTS

| | | | |
|---|---|---|---|
| 2,888,096 | 5/1959 | Evans | 55/459.1 |
| 2,931,581 | 4/1960 | Lykken et al. | 209/144 |
| 4,337,068 | 6/1982 | MacLean et al. | 55/1 |
| 4,364,905 | 12/1982 | Fahrig et al. | 55/349 |
| 4,378,234 | 3/1983 | Suzuki et al. | 55/460 |
| 4,404,095 | 9/1983 | Haddad et al. | 208/161 |
| 4,478,708 | 10/1984 | Farnsworth | 208/161 |
| 4,602,924 | 7/1986 | Eschenburg | 55/345 |
| 4,629,552 | 12/1986 | Haddad et al. | 208/153 |
| 4,666,586 | 5/1987 | Farnsworth | 55/1 |
| 4,666,674 | 5/1987 | Barnes | 422/147 |
| 4,689,206 | 8/1987 | Owen et al. | 55/459.4 |
| 4,721,561 | 1/1988 | Oetiker et al. | 209/144 |
| 4,793,915 | 12/1988 | Haddad et al. | 208/153 |

FOREIGN PATENT DOCUMENTS

| | | | |
|---|---|---|---|
| 0206399 | 12/1986 | European Pat. Off. | 208/153 |
| 0220768 | 5/1987 | European Pat. Off. | 55/349 |
| 904792 | 2/1982 | U.S.S.R. | 55/459.3 |
| 1102904 | 7/1984 | U.S.S.R. | 208/161 |
| 671221 | 4/1952 | United Kingdom | 55/345 |

Primary Examiner—Frank Spear
Assistant Examiner—Joseph Drodge
Attorney, Agent, or Firm—Kimbley L. Muller

[57] ABSTRACT

An apparatus is disclosed for the separation of solids from a mixture of solids and fluid, comprising a housing defining a plurality of separation chambers, each chamber being arranged around a central longitudinal axes and having a curved inner wall such that the intersection of the inner wall and a plane perpendicular to the central longitudinal axes is a concave line, whereby all central longitudinal axes are in one plane, and each chamber having an inlet opening, a solids outlet opening and at least one fluid outlet opening, whereby each fluid outlet opening is in communication with a fluid outlet conduit, and whereby the solids outlet opening of each chamber is in communication with a solids outlet conduit which is in tangential cooperation with the chamber, which apparatus further comprises one supply conduit for the mixture of fluid and solids whereby the supply conduit debouches into a supply opening that is formed by the combined inlet openings of all chambers which openings are communicating with each other, and in which apparatus the supply opening and the solids outlet openings are arranged at the same side of the plane of the central longitudinal axes of the separation chambers.

1 Claim, 3 Drawing Sheets

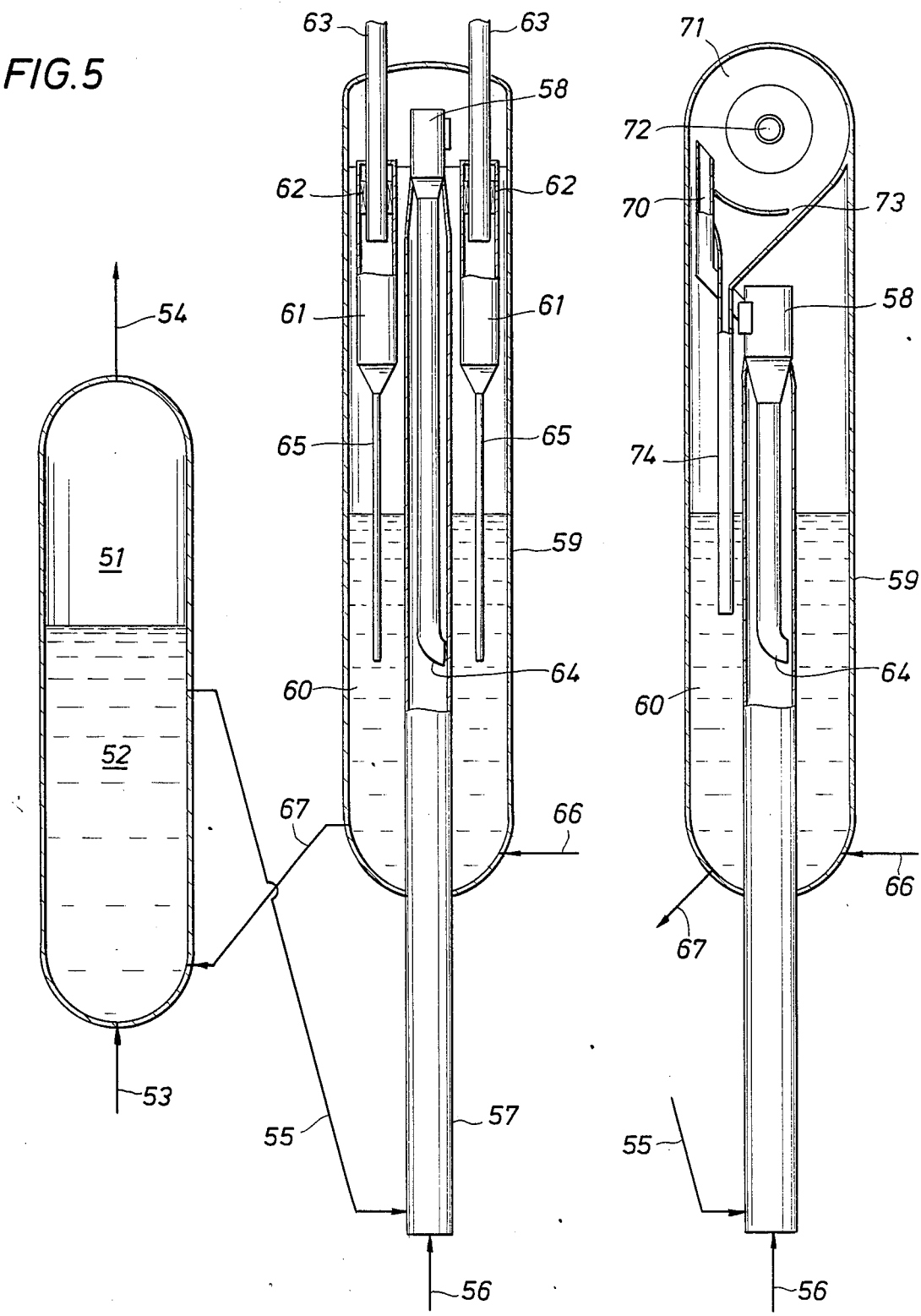

PROCESS FOR THE SEPARATION OF SOLIDS FROM A MIXTURE OF SOLIDS AND FLUID

FIELD OF INVENTION

The invention relates to an apparatus for the separation of solids from a mixture of solids and fluid and to the use of such an apparatus in a process for the separation of solids from a solids fluid mixture.

BACKGROUND OF INVENTION

A well-known apparatus for the separation of solids from a solids-fluid mixture is a cyclone wherein a solids-fluid mixture is entered horizontally and tangentially into a vertical cylindrical body from which the fluid is discharged at the top whereas solids are discharged from the bottom section of the cyclone. Horizontal cyclones are also known, in which the solids-fluid mixture enter tangentially into a horizontal cylindrical body from which the fluid is discharged via a horizontal pipe usually coaxial to the horizontal body of the cyclone, and the solids are discharged via a pipe at an end of the body opposite to the end at which the solids-fluid mixture is taken in.

From EP-A No. 0 206 399 an apparatus is known which comprises a housing with at least a domed shaped upper section, with an upwardly directed inlet for the solids-fluid mixture, a downwardly directed solids outlet and fluid outlets which are at a central part of the housing and substantially horizontal.

The apparatus according to EP-A 0 206 399 has the advantage over a cyclone-type of apparatus that the pressure drop in the apparatus is reduced and that the formation of dead spots is avoided. As to the performance of the apparatus, some improvements are possible.

From the example in the above European application it is apparent that the efficiency of the separation is about 95%. It would be advantageous if it were possible to have an apparatus with an even higher efficiency at one's disposal. Further, the apparatus tends to be rather complicated from a constructional point of view, and the accessibility to the apparatus, when it is positioned in e.g. a catalytic cracking reactor, tends to be troublesome.

BRIEF DESCRIPTION OF THE INVENTION

It has now surprisingly been found that a plurality of separation chambers contained in a housing yields excellent results as to efficiency and that the plurality of separation chambers enables a symmetrical configuration whereby the simplicity of the construction and the accessibility to the housing is increased.

DETAILED DESCRIPTION OF THE INVENTION

Accordingly, the present invention provides an apparatus for the separation of solids from a mixture of solids and fluid, comprising a housing defining a plurality of separation chambers, each chamber being arranged around a central longitudinal axes and having a curved inner wall such that the intersection of the inner wall and a plane perpendicular to the central longitudinal axes is a concave line, whereby all central longitudinal axes are in one plane, and each chamber has an inlet opening, a solids outlet opening and at least one fluid outlet opening, whereby each fluid outlet opening is in communication with a fluid outlet conduit and whereby the solids outlet opening of each chamber is in communication with a solids outlet conduit which is in tangential cooperation with the chamber, which apparatus further comprises one supply conduit for the mixture of fluid and solids whereby the supply conduit debouches into a supply opening that is formed by the combined inlet openings of all chambers which openings are communicating with each other, and in which apparatus the supply opening and the solids outlet openings are arranged at the same side of the plane of the central longitudinal axes of the separation chambers.

The number of separation chambers can be varied. In order not to make the construction of the housing too complicated the number of separation chambers is preferably from 2 to 4. The complexity of the construction can be substantially avoided and the symmetry can be relatively easily obtained when the number of separation chambers is two, which number is therefore preferred. To ensure an even distribution of the solids-fluid mixture over the separation chambers these chambers preferably have the same size.

The shape of the intersection of the inner wall of the separation chambers with a plane perpendicular to the central longitudinal axes is a concave line. Hence it is possible to have a concave line of e.g. an elliptical shape, or part of which has the shape of a parabole. It is, however, preferred to use separation chambers in which the intersection of the plane and the inner wall has a circular shape. It is even more preferred that the separation chambers have the shape of a body of revolution generated by a line revolving around the central longitudinal axes.

When the shape of the separation chambers is that of a body of revolution of a line revolving around a central longitudinal axes the line may have a variety of shapes. One suitable embodiment of the present invention is obtained when the line is curved. The line may run to the central longitudinal axes, thereby creating a ball-type body of revolution. It is preferred to have a curved line which is connected to the central longitudinal axes by means of one or two straight line segments, thereby creating truncated ball-type bodies of revolution. From a construction point of view the curved line is advantageously an arc of a circle thereby creating bodies of revolution having the shape of parts of a sphere. Preferably the line segment(s) is (are) perpendicular to the central longitudinal axes, thereby creating a disc of a sphere. These embodiments have the advantage that due to the curvature of the surface of the separation chambers the risk of dead spots is practically nil. The construction of an apparatus according to the invention becomes very convenient when the line for the generation of the body of revolution is a straight line segment parallel to the central longitudinal axes connected to the said axes by means of two other straight line segments In this way a cylinder-type body is created.

The two line segments connecting the parallel line segment with the central axes are preferably perpendicular to the said axes, so that a straight circle cylinder is obtained.

The supply conduit of the apparatus according to the present invention protrudes into the combined inlet openings of the separation chambers. It is apparent therefrom that the shape of the separation chambers is interfered with the combined inlet openings. Opposite to the supply conduit there is an arched surface, created by intersecting separation chambers.

The supply conduit may have a variety of shapes. Its cross-section may be circular, elliptical, square, rectangular or a mixture of any of these forms. Its cross-section advantageously has a longest dimension which is from 0.5 to 1 times the length of the central longitudinal axes of the separation chambers. The solids outlet openings of the separation chambers run preferably 0.6 to 1.0 times the length of the central longitudinal axes of the separation chambers.

The fluid outlet conduits are connected with a separation chamber via fluid outlet openings. These fluid outlet openings may have their centers on the central longitudinal axes. It is also possible for the fluid outlet openings to have their centers slightly off the central longitudinal axes. This promotes a scroll-type movement of the mixture to be separated. Each fluid outlet opening of a separation chamber is advantageously situated such that the opening includes at least one point of the central longitudinal axes of the separation chamber. The number of fluid outlet openings per separation chamber may be greater than 1, and is preferably 1 or 2. When the separation chamber contains two fluid outlet openings the latter are preferably situated diametrically opposite to each other. Preferably the fluid outlet conduits stretch into the separation chambers. It has been found that the separation efficiency is improved by this feature. The fluid is preferably a gas, such as gaseous hydrocarbons. The fluid outlet conduits can have various shapes, such as cylindrical, conical or combinations thereof. The conduits may further have a bend to pass the fluid separated into a desired direction.

The present invention further provides the use of the above described apparatus in a process for the separation of solids from a solids-fluid mixture. Hence, the invention provides a process for the separation of solids from a mixture of solids and fluid comprising passing the mixture via a supply opening into a plurality of separation chambers, each chamber being arranged around a central longitudinal axes and having a curved inner wall such that the intersection of the inner wall and a plane perpendicular to the central longitudinal axes is a concave line, whereby all central longitudinal axes are in one plane, withdrawing fluid from fluid outlet openings, and withdrawing solids from solids outlet openings situated on the same side of the plane of the central longitudinal axes as the supply opening. The present invention in particular provides the use of this apparatus in a process for separating fluid catalytic cracking catalyst particles from gaseous hydrocarbon conversion products. It is evident that the apparatus can be used in various other processes, such as shale conversion processes, oil gasification and coal gasification.

The apparatus according to the invention can be used as sole separation means. It is however, also possible to combine the apparatus with another separator of the same or different construction. So it is possible to have a series of subsequent apparatuses according to the present invention. It is also feasible to have a combination of an apparatus according to the invention and one or more cyclones, which may be horizontal or vertical. A suitable combination comprises the set-up in which the apparatus according to the invention is used as a first separating means whereby the fluid discharged from this apparatus is passed to a dome-shaped, preferably substantially spherical separator according to EP-A No. 0 206 399 in which the fluid is freed from substantially all solids that are entrained by the fluid, if any at all. Another suitable embodiment entails the combination of the apparatus according to the present invention as a first separating means, followed by swirl tubes, which can be similar to those described in EP-A No. 0 220 768.

Such combinations provide an improvement over the combination, shown in EP-A No. 0 220 768 of a dome-shaped separator and swirl tubes. The improvement resides in a reduction of the residence time in the combination of apparatuses at a given feed rate of the solids-fluid mixture. Especially when the apparatuses are used in a catalytic cracking process the residence time should be as short as possible to prevent further cracking to take place at the then very hot solid particles.

Accordingly, the present invention provides a process for the separation of solids from a mixture of solids and fluid comprising passing the mixture via a supply opening into a plurality of separation chambers, each chamber being arranged around a central longitudinal axes and having a curved inner wall such that the intersection of the inner wall and a plane perpendicular to the central longitudinal axes is a concave line, whereby all central longitudinal axes are in one plane, withdrawing fluid from fluid outlet openings, and withdrawing solids from solids outlet openings situated on the same side of the plane of the central longitudinal axes as the supply opening, and passing the withdrawn fluid upwardly and tangentially into a substantially spherical separation zone, wherein the withdrawn fluid is subjected to a rotating movement in a substantially vertical plane, removing solids, entrained by the withdrawn fluid, through an opening in the lower section of the separation zone and removing purified fluid via an outlet which debouches substantially horizontally into a central part of the spherical separation zone.

The invention further provides a process for the separation of solids from a mixture of solids and fluid by passing the mixture through the apparatus of the present invention as described herein-above, and then passing fluid withdrawn from the apparatus into a space between tubular elements and subsequently downwardly into annular spaces provided with swirl imparting means, which annular spaces are defined between upper sections of the tubular elements and lower sections of tubular fluid outlet means arranged substantially co-axially within said upper sections, imparting a swirling movement to the withdrawn fluid in the tubular elements to separate fluid from solids entrained by the withdrawn fluid, removing solids through lower sections of the tubular elements and removing purified fluid through the upper sections of the tubular outlet means.

BRIEF DESCRIPTION OF THE DRAWINGS

The present invention will be elucidated by the following figures.

FIG. 5 is a schematic drawing of a catalytic cracking reactor provided with a combination of two separating systems' the first system comprising an apparatus according to the invention and the second system comprising swirl tubes.

FIG. 6 shows an embodiment of a catalytic cracking reactor comprising an apparatus according to the present invention and a dome-shaped separator as described in EP-A No. 0 206 399.

DETAILED DESCRIPTION OF THE DRAWINGS

Figure 2:
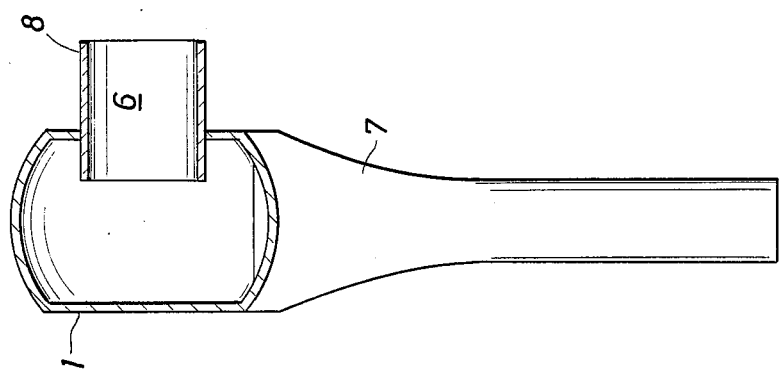
FIG. 2 is a cross-section of the embodiment of FIG. 1 according to II—II.
Figure 1:
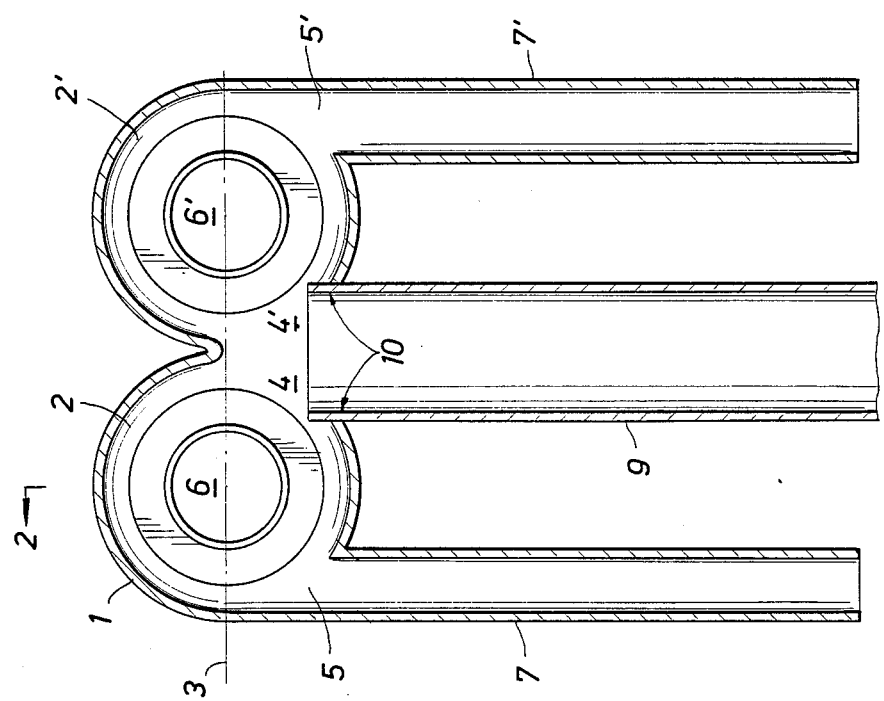
FIG. 1 shows a longitudinal cross-section of an apparatus according to the invention where the line for the generation of the body of revolution is curved and where the number of separation chambers is two, each separation chamber having one fluid outlet opening.

FIGS. 1 and 2 show an apparatus according to the invention comprising a housing 1 which defines two separation chambers 2 and 2'. The chambers have inlet openings 4 and 4', respectively, which in combination give a supply opening 10. Through the supply opening a supply conduit 9 is arranged via which the mixture of solids and fluid can be passed into the chambers. Solids leave the chambers via solids outlet openings 5 and 5' and solids outlet conduits 7 and 7' which are tangentially arranged to the chambers 2 and 2', respectively. It is apparent that the supply opening 10 and the solids outlet openings 5 and 5' are arranged at the same side of the plane through the central longitudinal axes which plane is indicated by a line 3. The fluid which is substantially freed from solids leaves the separation chambers via fluid outlet openings 6 and 6' and fluid outlet conduits (see conduit 8 in FIG. 2; the conduit attached to separation chamber 2' is not shown). In the embodiments of the FIGS. 1 and 2 the fluid outlet openings are arranged at one side of the housing. It will be evident that it is also possible to provide the fluid outlet openings at opposite sides of the housing.

Figure 4:
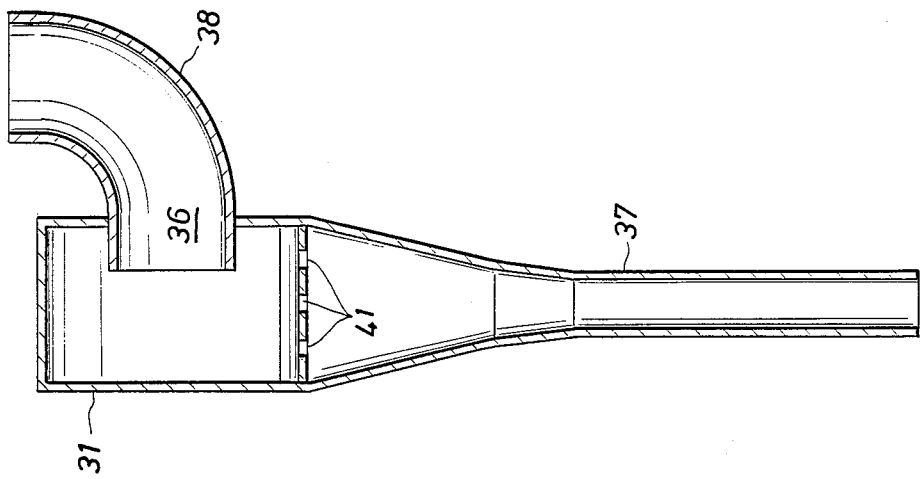
FIG. 4 is a cross-section of this embodiment according to IV—IV.
Figure 3:
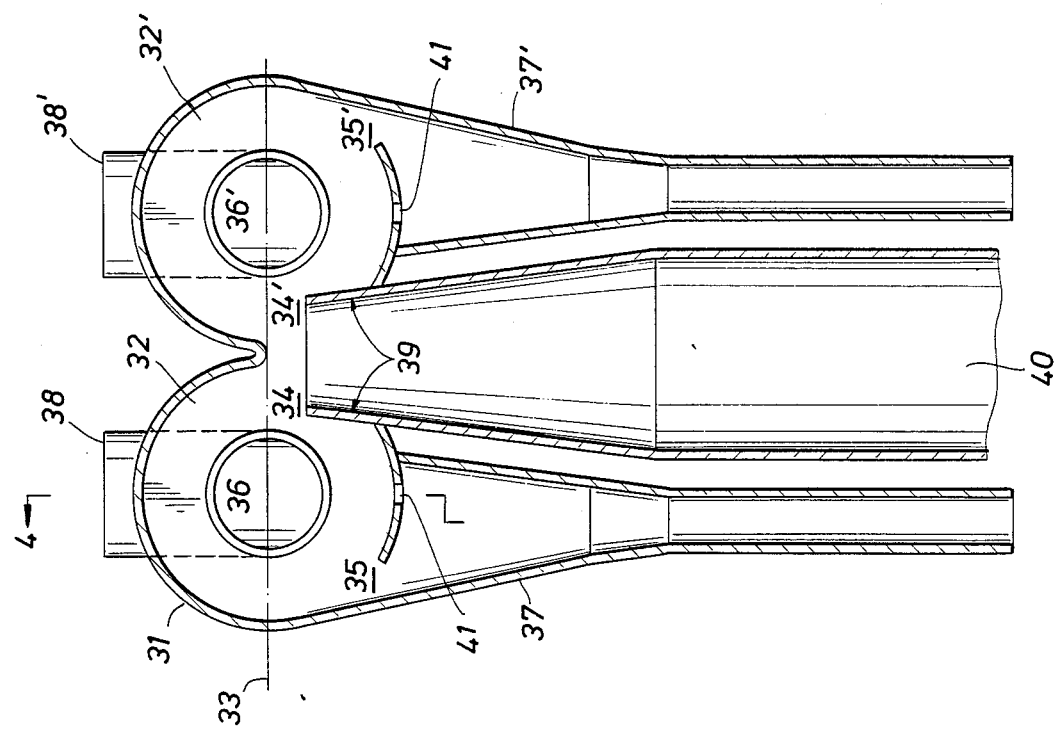
FIG. 3 is a longitudinal cross-section of an embodiment of the invention in which the line for the generation of the body of revolution is a straight parallel line segment.

In FIGS. 3 and 4 another embodiment of the apparatus of the invention is shown. This embodiment comprises a housing 31 defining separation chambers 32 and 32', each chamber having an inlet opening (34 and 34'), a solids outlet opening (35 and 35') and a fluid outlet opening (36 and 36'). Through a supply opening 39 a supply conduit 40 debouches into the separation chambers. The supply conduit 40 has a tapered end to stimulate the swirling movement of the solids-fluid mixture in the separation chambers. The fluid that is freed from solids leaves the separation chambers via fluid outlet openings 36 and 36' and fluid outlet conduits 38 and 38'. These conduits may be bent to pass the fluid into the desired direction. Solids that have been separated in this apparatus are discharged via solids outlet openings 35 and 35' and solids outlet conduits 37 and 37'. Part of the housing embraced by the solids outlet conduits may be provided with holes 41 to allow solids that may not have been discharged via the solids outlet leave the separation chambers.

FIG. 5 shows an application of the apparatus of the present invention in a catalytic cracking process. In a regenerator 51 containing a catalyst bed 52, catalyst particles are regenerated by burning off coke from coke-containing catalyst particles. This is done by passing an oxidizing gas, e.g. air to the regenerator via a line 53 and withdrawing combustion gases via an outlet 54. Catalyst particles thus regenerated are passed to a riser reactor 57 via a line 55. In the reactor the catalyst is combined with a hydrocarbon feedstock from line 56 and passed upwards through the riser reactor. In the reactor the hydrocarbon feedstock is cracked to produce light gaseous hydrocarbons. During the cracking reaction some coke will be formed on the catalyst particles. At the top of the reactor the apparatus of the present invention (58) is arranged, and gas coming from this apparatus is passed to tubes 61 which contain swirl vanes 62 and gas outlets 63. Catalyst particles that have been entrained by the gas in the apparatus 58 are separated from the gas in these swirl tubes and the gaseous hydrocarbons are recovered. The catalyst particles that have been separated from the mixture of catalyst and hydrocarbon feedstock are discharged from the apparatus 58 via a solids outlet conduit 64. Diplegs 65 are connected to tubes 61 and pass catalyst into catalyst bed 60 comprised in a stripping vessel 59. The vessel is equipped with means to provide stripping gas into the vessel (not shown) which is supplied via a line 66. From the vessel 59 catalyst particles are then returned to the regenerator 51 via a line 67.

FIG. 6 shows schematically a catalytic cracking reactor, wherein a dome-shaped separator is provided after the apparatus of the present invention. Corresponding equipment features have the same numbering as shown in FIG. 5. A mixture of catalyst particles and hydrocarbons is passed through an apparatus according to the present invention (58). Catalyst particles separated are passed to the catalyst bed 60 via a solids outlet conduit 64. Gaseous hydrocarbons which may entrain some solid matter is passed via an inlet 70 into a globe-type separator 71. Gas is discharged via an outlet 72, and solid matter separated in the separator 71 is discharged via an opening 73 and a dipleg 74 into the catalyst bed 60.

What is claimed is:

1. A process for the separation of solids from a mixture of solids and fluid in a reactor comprising passing the mixture upwardly via a supply opening which branches into a plurality of separation chambers in the upper portion of the reactor, each chamber being arranged around a central longitudinal axes and having a curved inner wall such that the intersection of the inner wall and a plane perpendicular to the central longitudinal axes is a concave line, wherein all central longitudinal axes are in one plane, withdrawing fluid from fluid outlet openings, and withdrawing solids downwardly from solids outlet openings situated on the same side of the plane of the central longitudinal axes as the supply opening, and passing the withdrawn fluid upwardly and tangentially into a substantially spherical separation zone located above the separation chambers in the reactor, wherein the withdrawn fluid is subjected to a rotating movement in a substantially vertical plane, removing solids, entrained by the withdrawn fluid, through an opening in the lower section of the separation zone and removing purified fluid via an outlet which debouches substantially horizontally into a central part of the spherical separation zone.

* * * * *